(No Model.)
C. L. KELSO & J. C. JOHANUS.
PLANTER ATTACHMENT.
No. 587,975. Patented Aug. 10, 1897.
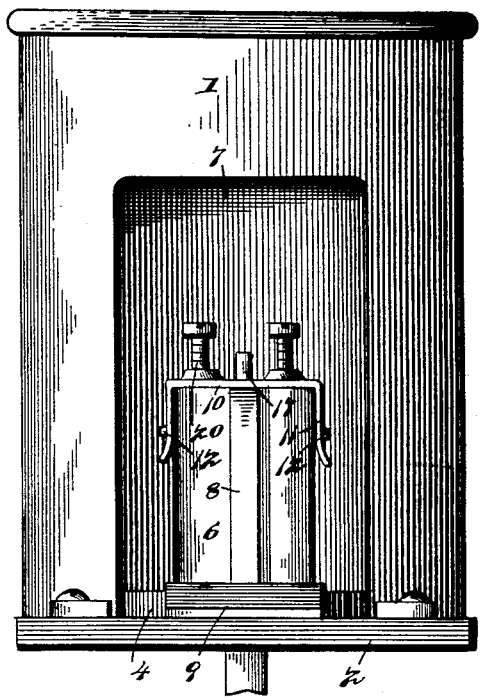
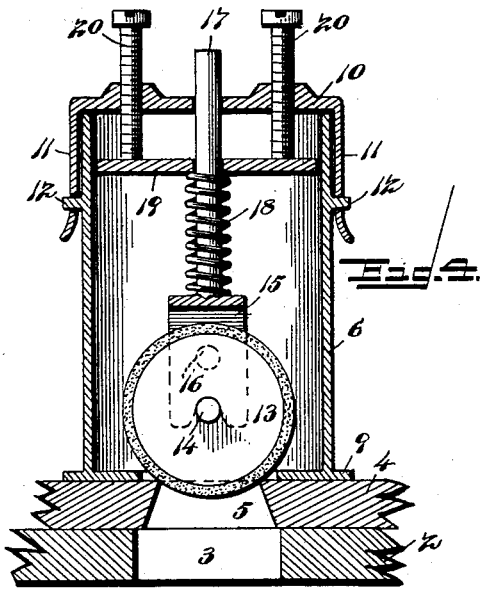
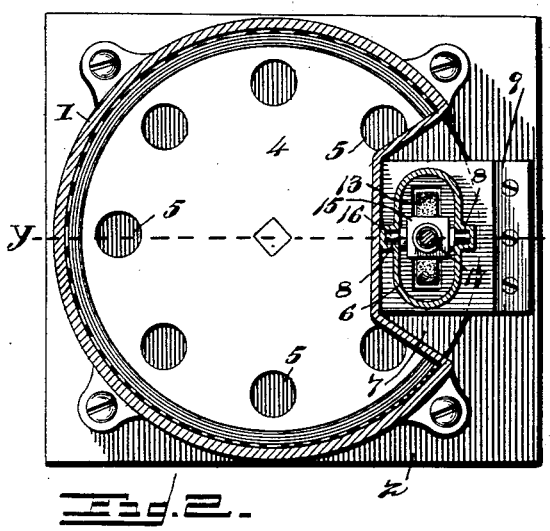
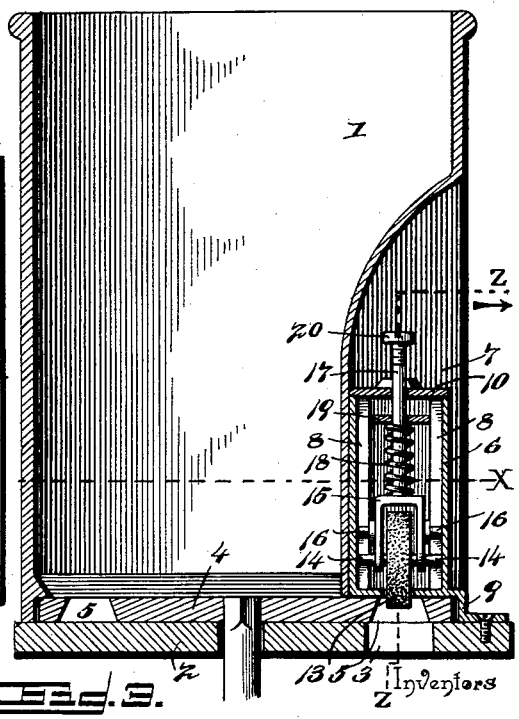
Witnesses
E. H. Stewart
U. B. Hillyard
Inventors
Charles L. Kelso
John C. Johanus
By their Attorneys,
C. A. Snow & Co.

UNITED STATES PATENT OFFICE.

CHARLES L. KELSO AND JOHN C. JOHANUS, OF ROCK RAPIDS, IOWA.

PLANTER ATTACHMENT.

SPECIFICATION forming part of Letters Patent No. 587,975, dated August 10, 1897.

Application filed January 18, 1897. Serial No. 619,604. (No model.)

*To all whom it may concern:*

Be it known that we, CHARLES L. KELSO and JOHN C. JOHANUS, citizens of the United States, residing at Rock Rapids, in the county of Lyon and State of Iowa, have invented a new and useful Planter Attachment, of which the following is a specification.

This invention belongs to that class of devices which are used in conjunction with the dropping-plates of seeding mechanism to force the grain from the pockets or openings, thereby insuring a dropping of the seed at predetermined times.

In its construction the attachment comprises a case, an ejector-wheel located within the case and adapted to travel upon the seed-dropping plate and of such relative size as to extend into the openings thereof and forcibly dislodge and eject the grain, a spring-actuated frame exerting a downward pressure upon the ejector-wheel, and means for regulating the tension of the spring according to existing conditions.

For a full understanding of the merits and advantages of the invention reference is to be had to the accompanying drawings and the following description.

The improvement is susceptible of various changes in the form, proportion, and the minor details of construction without departing from the principle or sacrificing any of the advantages thereof, and to a full disclosure of the invention an adaptation thereof is shown in the accompanying drawings, in which—

Figure 1 is a side elevation of a hopper, showing the application of the invention. Fig. 2 is a plan section on the line X X of Fig. 3. Fig. 3 is a vertical section on the line Y Y of Fig. 2. Fig. 4 is a detail section on the line Z Z of Fig. 3, looking in the direction of the arrow.

Corresponding and like parts are referred to in the following description and indicated in the several views of the drawings by the same reference-characters.

The hopper 1 may be of any desired form, although shown circular in outline, and its bottom 2 is supplied with the usual discharge-opening 3 for the egress of the grain into the drill or spout. The seed-plate 4 has openings 5 of required size and number, and which are slightly contracted at their upper ends to permit of the free discharge of the grain, especially when the latter is assisted by an ejector, which forms the subject-matter of this invention.

A case 6 is properly situated and contains the means whereby a positive discharge of the grain is effected, and, as shown, this case is located exterior to the hopper and in a recess 7, formed in a side thereof, so as not to interfere with the grain or be obstructed in its movements thereby. This case is oblong in plan section and has guideways 8 in its sides at diametrically opposite points, formed by pressing a portion of the case outward, as clearly indicated in Fig. 2. A plate 9 supports the case and extends over the projecting edge portion of the seed-plate 4, and its outer edge portion is bent and secured to the hopper-bottom 2, as most clearly indicated in Fig. 3. A cap 10 closes the upper end of the case and is provided with depending spring-ears 11, which are apertured to snap over studs 12 at the opposite sides of the case, thereby holding the cap in place and admitting of it being readily removed for any required purpose.

An ejector-wheel 13, rubber-faced to prevent injurious contact with the grain, has the ends of its axle 14 loosely fitted in the guideways 8, so as to move freely therein and direct the wheel in its various adjustments. A forked frame 15 straddles the ejector-wheel and is mounted upon the ends of the axle 14, and the lower ends of its side members are notched to receive the axle, as most clearly indicated in Fig. 4, thereby holding the parts in fixed relation. Studs 16 project from the side members of the fork and operate in the guideways 8 and direct it in its vertical movements. A stem 17 forms a part of the forked frame or is applied thereto and operates through an opening in the cap 10 and receives a coil-spring 18, which is mounted thereon and confined between the fork 15 and a plate 19, which is located in the case and is centrally apertured for the stem 17 to operate loosely therethrough. Tension-screws 20 are mounted in threaded openings in the cap 10 and engage with the opposite ends of the plate 19 and serve to compress the spring 18, so as to cause the ejector-wheel to bear with a greater or less pressure upon the seed-plate 4.

The device is so situated that the ejector-wheel will travel upon the edge portion of the seed-plate and drop into the openings 5 as the latter register or come beneath it, so as to force the grain from the openings 5 into the opening 3, from whence it will be directed to the ground by a spout or drill in the ordinary manner.

Having thus described the invention, what is claimed as new is—

1. In a seed-dropping mechanism, the combination of a case having guideways, an ejector-wheel located within the case and directed in its vertical movements by the said guideways, a forked frame straddling the ejector-wheel and having the lower ends of the side members notched to receive the ends of the axle upon which the ejector-wheel is mounted, and a spring exerting a downward pressure upon the forked frame, substantially as and for the purpose set forth.

2. In a seed-dropping mechanism, the combination of a case having guideways, an axle having its end portions entering the said guideways, an ejector-wheel mounted upon the axle, a forked frame straddling the ejector-wheel and having the lower ends of its side members notched to receive the end portions of the aforesaid axle, and having studs or lateral extensions operating in the said guideways, and a spring for exerting a downward pressure upon the forked frame, substantially as set forth for the purpose described.

3. In a seed-dropping mechanism, the combination of a case having guideways, a cap removably fitted to the case and held thereto by positive means, an ejector-wheel, a forked frame mounted upon the axle of the ejector-wheel and having lateral projections operating in the aforesaid guideways, and provided with a stem working through an opening in the cap, a spring mounted upon the said stem, a plate located within the case and having an opening for the stem of the forked frame to operate loosely through, and engaging with the upper end of the said spring, and tension-screws mounted in the cap and bearing against the said plate, substantially as and for the purpose set forth.

4. The herein-described ejector attachment for planters, comprising a case having guideways and lateral extensions, a cap for closing the case having apertured spring-ears to engage with the lateral extensions, an ejector-wheel, a forked frame mounted upon the axle of the ejector-wheel and having a stem and lateral extensions, a spring, a plate supported by the spring and having the said stem operating therethrough, and tension-screws carried by the cap and engaging with the said plate, substantially as and for the purpose set forth.

In testimony that we claim the foregoing as our own we have hereto affixed our signatures in the presence of two witnesses.

CHARLES L. KELSO.
JOHN C. JOHANUS.

Witnesses:
EDDIE ROBINSON,
JOHN FADER.